(12) United States Patent
Urdaneta et al.

(10) Patent No.: US 12,270,277 B2
(45) Date of Patent: Apr. 8, 2025

(54) METHODOLOGY AND SYSTEM FOR ELECTRONIC CONTROL AND ACQUISITION OF DOWNHOLE VALVE

(71) Applicant: Schlumberger Technology Corporation, Sugar Land, TX (US)

(72) Inventors: Carlos Urdaneta, Houston, TX (US); Mark Hofacker, Sugar Land, TX (US); Jordi Juan Segura Dominguez, Tananger (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 73 days.

(21) Appl. No.: 17/657,499

(22) Filed: Mar. 31, 2022

(65) Prior Publication Data
US 2023/0313639 A1   Oct. 5, 2023

(51) Int. Cl.
| | |
|---|---|
| *E21B 34/06* | (2006.01) |
| *E21B 23/04* | (2006.01) |
| *E21B 47/06* | (2012.01) |
| *F16K 37/00* | (2006.01) |

(52) U.S. Cl.
CPC ........ *E21B 34/066* (2013.01); *E21B 23/0413* (2020.05); *E21B 47/06* (2013.01); *F16K 37/0041* (2013.01); *F16K 37/0066* (2013.01)

(58) Field of Classification Search
CPC .... E21B 34/066; E21B 23/0413; E21B 47/06; F16K 37/0041; F16K 37/0066
See application file for complete search history.

(56) References Cited

U.S. PATENT DOCUMENTS

| | | | |
|---|---|---|---|
| 4,798,247 A | * | 1/1989 | Deaton ................... E21B 34/16 251/129.2 |
| 4,913,231 A | | 4/1990 | Muller et al. |
| 6,176,318 B1 | | 1/2001 | Drakeley et al. |
| 6,543,544 B2 | | 4/2003 | Schultz et al. |
| 7,051,810 B2 | | 5/2006 | Clemens et al. |

(Continued)

FOREIGN PATENT DOCUMENTS

| | | |
|---|---|---|
| CN | 206458407 U | 9/2017 |
| EP | 2281105 A1 | 2/2011 |

(Continued)

OTHER PUBLICATIONS

Office Action issued in U.S. Appl. No. 17/657,514 dated Nov. 23, 2022, 9 pages.

(Continued)

*Primary Examiner* — Tara Schimpf
*Assistant Examiner* — Neel Girish Patel
(74) *Attorney, Agent, or Firm* — Jeffrey D. Frantz (57) ABSTRACT

A technique facilitates control over a downhole well operation. The technique utilizes an electronic control system for controlling actuation of a valve downhole. The valve, in turn, is operated to enable selective control over fluid flows governing the actuation of a downhole tool and/or other downhole operations. In some embodiments, the electronic control system may work in cooperation with a downhole hydraulic system to provide a downhole electro-hydraulically actuated valve system. A monitoring system provides feedback regarding the valve position and/or status of the downhole operation.

7 Claims, 6 Drawing Sheets

(56) References Cited

U.S. PATENT DOCUMENTS

| | | |
|---|---|---|
| 7,967,067 B2 | 6/2011 | Irani et al. |
| 9,890,611 B2 | 2/2018 | Lee et al. |
| 10,006,282 B2 | 6/2018 | Livescu et al. |
| 10,385,680 B2 | 8/2019 | Livescu et al. |
| 10,876,377 B2 | 12/2020 | Quero et al. |
| 10,947,794 B2 | 3/2021 | Noui-Mehidi et al. |
| 2004/0026086 A1 | 2/2004 | Patel |
| 2007/0295515 A1 | 12/2007 | Veneruso et al. |
| 2009/0114447 A1* | 5/2009 | Reid, Jr. ............... E21B 25/00 175/58 |
| 2011/0147086 A1 | 6/2011 | Hummes et al. |
| 2011/0168403 A1 | 7/2011 | Patel |
| 2012/0048561 A1 | 3/2012 | Holderman |
| 2012/0085539 A1 | 4/2012 | Tønnessen et al. |
| 2013/0014939 A1 | 1/2013 | Martinez et al. |
| 2013/0192848 A1 | 8/2013 | Patel et al. |
| 2013/0206401 A1* | 8/2013 | Bhoite ............... E21B 34/066 166/250.01 |
| 2014/0083689 A1* | 3/2014 | Streich ............... E21B 34/102 166/250.15 |
| 2014/0196953 A1 | 7/2014 | Chitwood et al. |
| 2014/0352955 A1* | 12/2014 | Tubel ............... E21B 47/12 166/250.15 |
| 2015/0136425 A1 | 5/2015 | Burgos et al. |
| 2016/0115753 A1 | 4/2016 | Frazier et al. |
| 2016/0335464 A1* | 11/2016 | Ownby ............... G06K 7/10316 |
| 2017/0191346 A1 | 7/2017 | Nicholson |
| 2017/0260834 A1 | 9/2017 | Chacon et al. |
| 2017/0284168 A1 | 10/2017 | Zevenbergen et al. |
| 2017/0292353 A1* | 10/2017 | Liu ............... F04B 47/02 |
| 2018/0023358 A1 | 1/2018 | Moyes |
| 2018/0094490 A1* | 4/2018 | Lines ............... E21B 7/067 |
| 2018/0245428 A1 | 8/2018 | Richards |
| 2018/0274331 A1* | 9/2018 | Richards ............... E21B 43/045 |
| 2018/0347350 A1* | 12/2018 | Frith ............... E21B 47/24 |
| 2019/0203538 A1 | 7/2019 | Wisinger, Jr. et al. |
| 2019/0226294 A1 | 7/2019 | Hansen |
| 2019/0316440 A1* | 10/2019 | Honeker ............... E21B 47/07 |
| 2020/0115992 A1 | 4/2020 | Wang et al. |
| 2020/0217197 A1 | 7/2020 | Adebiyi |
| 2020/0332613 A1 | 10/2020 | Al Hussin |
| 2021/0131224 A1 | 5/2021 | Radford et al. |
| 2021/0254431 A1 | 8/2021 | Prost |
| 2021/0320578 A1* | 10/2021 | Sheth ............... F04D 29/406 |
| 2023/0003106 A1* | 1/2023 | Conzemius ............... E21B 43/119 |

FOREIGN PATENT DOCUMENTS

| | | |
|---|---|---|
| EP | 3268831 A1 | 1/2018 |
| WO | 03018955 A1 | 3/2003 |
| WO | 2022016023 A2 | 1/2022 |

OTHER PUBLICATIONS

International Search Report and Written Opinion issued in International Patent application PCT/US2023/017022 dated Jul. 12, 2023, 11 pages.

International Search Report and Written Opinion issued in International Patent application PCT/US2023/016801 dated Jul. 12, 2023, 10 pages.

International Search Report and Written Opinion issued in International Patent application PCT/US2023/017018 dated Jul. 28, 2023, 11 pages.

Office Action issued in U.S. Appl. No. 17/657,514 dated May 3, 2023, 10 pages.

Office Action issued in U.S. Appl. No. 17/657,523 dated Sep. 14, 2023, 26 pages.

* cited by examiner

METHODOLOGY AND SYSTEM FOR ELECTRONIC CONTROL AND ACQUISITION OF DOWNHOLE VALVE

BACKGROUND

In many well applications, a well string is deployed downhole into a borehole, e.g. a wellbore. A given well string may comprise packers and other well tools which are actuated downhole. Traditional methods for actuating downhole packers and other well tools often include dropping a ball from the surface down to a ball seat associated with a given well tool. Appropriate pressure may then be applied down through the well string to cause well tool actuation. For example, pressure can be applied to the dropped ball to shift a valve which, in turn, would direct fluid flow to inflate or otherwise actuate a packer. Other types of downhole actuation rely on complex mechanical valves operated via pumping pressure or involve mechanically pushing or pulling on well tubing to achieve the desired downhole well tool actuation.

SUMMARY

In general, a methodology and system facilitate control over a downhole well operation. The technique utilizes an electronic control system for controlling actuation of a valve downhole. The valve, in turn, is operated to enable selective control over fluid flows governing the actuation of a downhole tool and/or other downhole operations. In some embodiments, the electronic control system may work in cooperation with a downhole hydraulic system to provide a downhole electro-hydraulically actuated valve system. A monitoring system provides feedback regarding the valve position and/or status of the downhole operation.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system which facilitate control over a well tool actuated downhole. The technique utilizes an electronic control system for controlling actuation of a valve downhole. The valve, in turn, is operated to enable selective control over fluid flows governing the actuation of a downhole tool and/or other downhole operations. For example, the valve may be selectively actuated to operational positions which enable flow of fluid for recirculation, to actuate an inflatable packer, to provide a well treatment, or to enable another desired downhole operation. In some embodiments, the electronic control system may work in cooperation with a downhole hydraulic system to provide a downhole electro-hydraulically actuated valve system. A monitoring system provides feedback regarding the valve position and/or status of the downhole operation.

According to an embodiment, the well system comprises a downhole electro-hydraulically actuated valve system comprising a valve, a motor, a pump driven by the motor, a motor controller driver board, a power supply board, an acquisition and control processor board, and a sensor system. The sensor system may comprise a variety of sensors selected and positioned to monitor and provide feedback with respect to valve position. Examples of sensors include pressure sensors, temperature sensors, speed sensors, and position sensors. The methodology also may comprise using control algorithms which enable the reliable actuation and monitoring of the valve from the surface under downhole conditions, e.g. harsh downhole environmental conditions.

Depending on the parameters of desired downhole operations, environmental conditions, and available equipment, embodiments of the methodology and system described herein may utilize a variety of techniques, components, and configurations. In some applications, for example, the downhole motor may be controlled to ensure the valve is actuated according to a target position while reducing motor temperature. The motor control may be based on data obtained by monitoring hydraulic fluid temperature and adjusting motor current accordingly.

In some applications, valve position may be deduced through hydraulic pressure measurements based on monitored data which may include hydraulic oil pressure and/or motor current to determine when a valve piston has reached a target position, e.g. the end of its stroke. Another approach to monitoring valve piston position is by mapping pump rotations according to displacement. This approach may be made more accurate by including the effects of temperature and pressure on oil volume and pump efficiency. In some applications, hydraulic fluid pressure may be estimated as a function of motor current and this data may be used to assess valve piston position.

In various embodiments, robust valve actuation resistant to sensor failure may be achieved via multiple layers of valve actuation sensing redundancy, e.g. redundant use of current sensors, pressure sensors, and/or Hall effect position sensors. Various other sensor systems, such as tattletale proximity switch systems, also may be used to monitor valve position. Additionally, some embodiments may utilize a valve piston with a ball seat so that a dropped ball may be used as a contingency mechanism for shifting the valve between operational positions. In some applications, a cooling system may be used to cool the motor. For example, the cooling system may utilize a metal chassis frame which allows heat conduction from the motor to the fluid pumped through the tool string. To further aid motor operation, some embodiments may incorporate a low power consumption actuation mode which reduces the power used by the motor. This type of mode is useful with, for example, battery-powered tool strings by reducing motor current output when the valve is at a target position.

Figure 1:
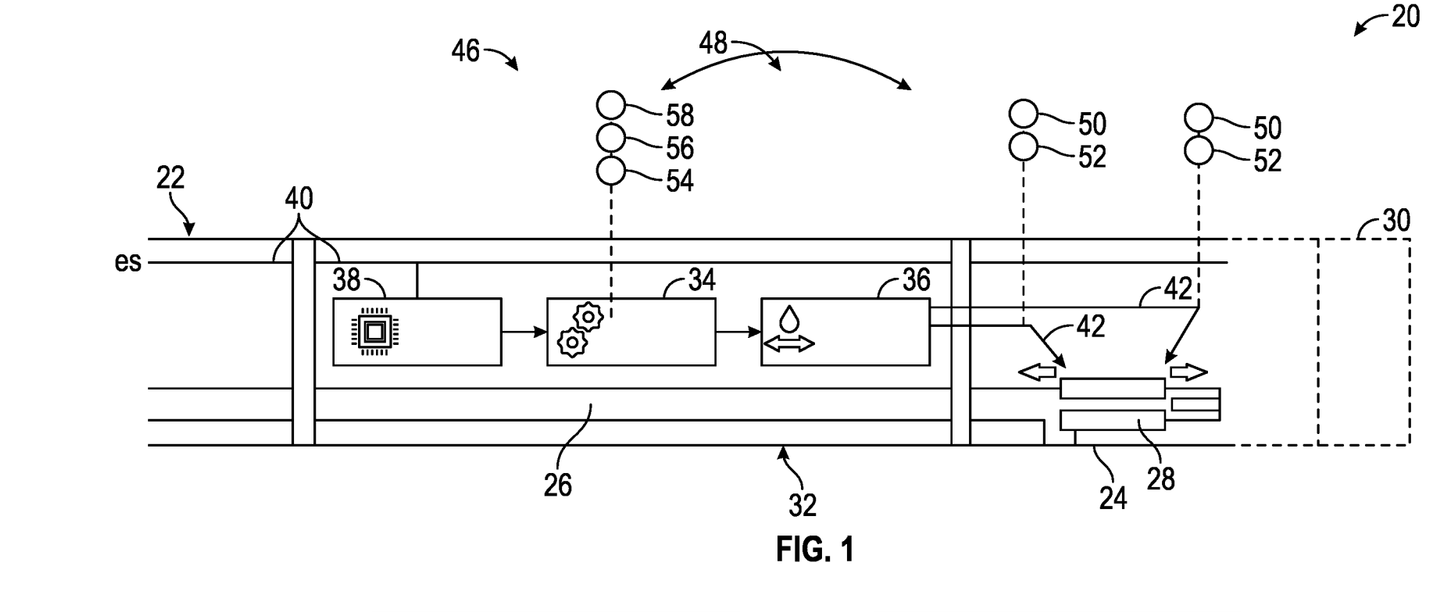
FIG. 1 is a schematic illustration of an example of a well system having a valve deployed along a well string and operated via electronic control input, according to an embodiment of the disclosure.

Referring generally to FIG. 1, an example of a well system 20 is illustrated as deployed along a well string 22. Well system 20 comprises a valve 24 shiftable between a plurality of operational positions to control fluid flows directed along an interior 26 of the well string 22. By way of example, the valve 24 may comprise a piston 28 which is selectively movable/shiftable between different valve positions and thus different operational modes. The different valve positions are used to control the flow of fluid along interior 26 so as to direct that fluid to, for example, a well tool 30 actuated via the fluid. The valve 24 also may be shifted to positions for directing the flow of fluid from interior 26 to different well tools 30 or for other downhole operations. In some applications, well tool 30 may comprise one or more packers.

According to an embodiment, the well system 20 further comprises an actuator module 32 which responds to electronic control signals to hydraulically actuate piston 28 between operational flow positions. By way of example, the actuator module 32 may comprise a motor 34, a pump 36 connected to the motor 34, and a motor controller 38 which receives electronic control signals which control operation of the motor 34 and thus of valve 24. According to an embodiment, the motor controller 38 receives electronic control signals from the surface via wires 40 or other signal transmission lines. The motor 34 and pump 36 may be constructed as a positive displacement motor and pump combination.

As explained in greater detail below, the motor controller 38 may comprise various control boards and may be programmable with control algorithms which enable the reliable actuation and monitoring of the valve 24. Based on control signal sent from the surface, the motor controller 38 controls the speed and/or direction of operation of motor 34. This operation of motor 34, in turn, controls the direction and speed of pump 36. In this example, pump 36 is a bi-directional pump. The motor controller 38 also may process monitoring data and provide corresponding information to the surface to facilitate surface control. Effectively, the motor controller 38 establishes an electronic control system for controlling actuation of the downhole valve 24. The valve 24, in turn, is operated to enable selective control over fluid flows governing the actuation of downhole tool 30 and/or other downhole operations. The electronic control enabled by motor controller 38 working in cooperation with motor 34 and pump 36 to hydraulically actuate valve 24 provides a reliable, downhole electro-hydraulically actuated valve system.

Figure 2:
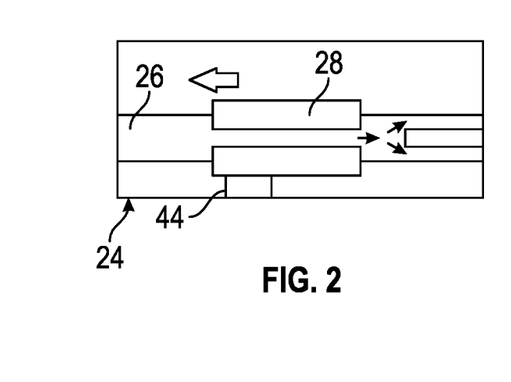
FIG. 2 is a schematic illustration of the valve illustrated in FIG. 1 in a given operational position, according to an embodiment of the disclosure.

The pump 36 includes or is supplied with hydraulic actuating fluid which is delivered to piston 28 of valve 24 via actuation flowlines 42. Thus, by operating pump 36 in a given direction via motor 34 according to control instructions provided by motor controller 38, the piston 28/valve 24 may be shifted to desired operational positions. For example, directing fluid flow to one side of piston 28, the piston 28 (and thus valve 24) is shifted to an operational flow position which directs fluid flowing along interior 26 to the well tool 30 so as to actuate the well tool 30 (see also FIG. 2).

Figure 3:
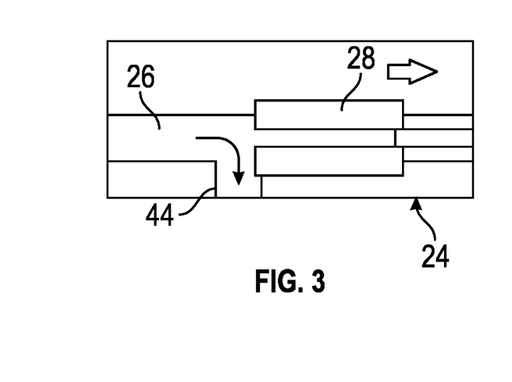
FIG. 3 is a schematic illustration of the valve illustrated in FIG. 2 but showing the valve in the different operational position, according to an embodiment of the disclosure.

If fluid flow is directed to the other side of piston 28, the piston 28 (and thus valve 24) is shifted in an opposite direction to another operational flow position which directs fluid flowing along interior 26 through a side passage 44, as illustrated in FIG. 3. The fluid directed into side passage 44 may be recirculated, used in a well treatment operation, directed to another well tool 30, and/or used for other downhole operations. It should be noted the valve 24 is illustrated as shiftable between two operational flow positions. However, the valve 24 may be constructed for shifting between three or more positions depending on the downhole operations to be performed.

In this example, the well system 20 also comprises a sensor system 46 having a plurality of sensors 48 which may be positioned at various locations to monitor the position of piston 28/valve 24 and/or to provide other data regarding the downhole operation. The data from sensor system 46 may be provided to the motor controller 38 and/or to the surface for use in determining appropriate control signals to be sent downhole.

By way of example, the sensors 48 may comprise pressure sensors 50 which may be positioned, for example, along the flowlines 42 on opposite sides of piston 28. Data obtained by pressure sensors 50 may be used to deduce valve position via the hydraulic pressure measurements and pressure differentials on opposite sides of piston 28. In some embodiments, the sensors 48 may comprise temperature sensors 52 which may be similarly located along flowlines 42 on opposite sides of piston 28. The temperature sensors 52 may be used to assist in monitoring the operational position of valve 24 and/or the temperature of motor 34.

The sensors 48 also may comprise a variety of other sensors, such as a voltage sensor 54 to monitor voltage associated with motor 34. Similarly, the sensors 48 may comprise a current sensor 56 to monitor current associated with operation of motor 34. The sensors 48 also may comprise a speed sensor 58 which may be used to monitor the rotations and/or rotational speed of motor 34. This type of data may be used, for example, to map corresponding pump rotations so as to estimate the position of piston 28 based on displacement of hydraulic fluid through flowlines 42. Various other sensors 48 also may be used to provide desired data for monitoring operation of valve 24. The data from sensors 48 may be processed in a variety of ways to facilitate monitoring of the operation and performance of valve 24.

Figure 4:
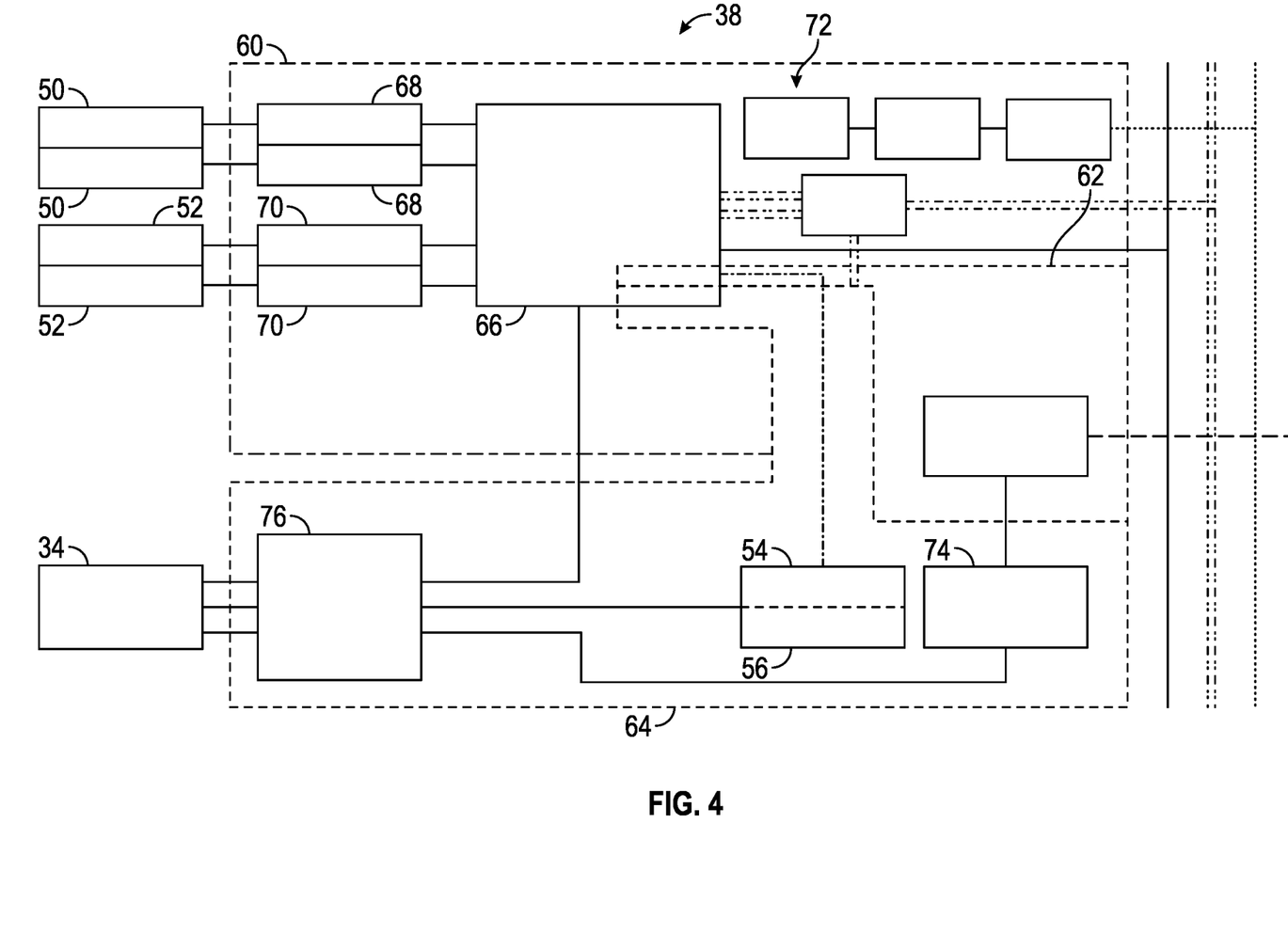
FIG. 4 is a schematic illustration of an example of an actuator module having control boards configured to enable electronic control over valve positioning, according to an embodiment of the disclosure.

Referring generally to FIG. 4, an example of motor controller 38 is illustrated. In this example, motor controller 38 comprises a plurality of operatively coupled control boards which may include a main acquisition and control board 60, a power supply board 62, e.g. a motor DC-DC converter board, and a motor controller board 64, e.g. a motor controller driver board. Motor controller 38 may have a variety of configurations capable of receiving instructions/control signals from the surface and receiving data from sensors 48.

By way of example, the main acquisition and control board 60 may comprise a processor 66, e.g. a microprocessor, programmed with the desired algorithms enabling reliable actuation and monitoring of valve 24. In the example illustrated, processor 66 is connected to pressure sensors 50 and temperature sensors 52 via corresponding pressure channels 68 and temperature channels 70, respectively. The processor 66 also may receive voltage data, current data, and position data from the various other sensors 48, e.g. current sensor 56 and voltage sensor 54.

The motor controller board 64 and power supply board 62 work in cooperation with the main acquisition and control board 60, as illustrated, to enable use of a motor power supply 72 to provide appropriate electrical power to motor 34. For example, an appropriate current/voltage may be determined by processor 66 and provided to motor 34 via a capacitor bank 74 and suitable motor drivers 76. The processor 66 also may be provided with control signals, e.g. electronic control signals, from the surface to control the desired directional rotation and speed of motor 34 for actuating valve 24.

According to one operational control paradigm, control of the downhole motor 34 is conducted to ensure the valve 24 is actuated according to a target position while reducing motor temperature. The motor temperature may be tracked by monitoring the hydraulic actuating fluid temperature via temperature sensors 52 and by adjusting motor current accordingly. The motor current may be monitored via current sensor 56.

In this example, a dataset may be captured from the two temperature sensors 52, voltage sensor 54, and current sensor 56. The temperature of motor 34 may be estimated according to, for example, a data table based on temperatures of the hydraulic actuating fluid measured via temperature sensors 52. The temperature data combined with motor current data (and sometimes physical valve position data) may be used to estimate motor temperature. As the temperature of motor 34 approaches a threshold, e.g. a maximum rated temperature, a control algorithm in processor 66 proportionally reduces the allowed current during actuation of valve 24 and also when the valve has arrived at a target position. The control algorithm may be constructed so that if the motor 34 reaches a temperature exceeding a maximum threshold the motor 34 is turned off until the temperature drops below the maximum threshold (or below another predetermined temperature level).

Figure 5:
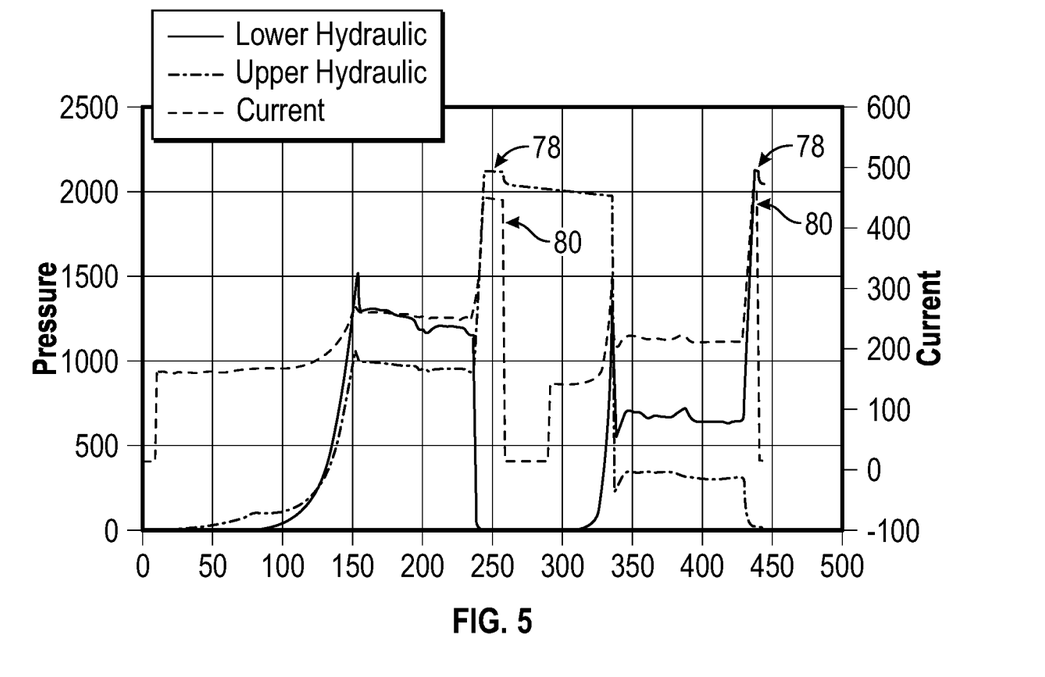
FIG. 5 is a graphical illustration showing the use of sensor data to deduce valve position, according to an embodiment of the disclosure.

As illustrated graphically in FIG. 5, the position of valve 24 may be deduced via hydraulic pressure measurements and/or motor current by determining when piston 28 has reached an end of its stroke. It should be noted the pressure, current, and time (horizontal axis in seconds) figures in the graph of FIG. 5 are provided simply for purposes of explanation and various other values may apply depending on the type of motor, piston stroke, and other parameters. In this example, data is collected from the two pressure sensors 50, e.g. the lower hydraulic pressure sensor and the upper hydraulic pressure sensor, and the current sensor 56.

In FIG. 5, the collected data indicates the hydraulic piston 28 shifts in a downhole direction between the 100 and 250 seconds marks and undergoes an uphole shift between the 280 and 480 second marks. As demonstrated by the graph, the pressure values correlate with the position of piston 28. When the valve 24/piston 28 is actuated in the downhole direction, the upper hydraulic pressure is higher than the lower hydraulic pressure by a given differential threshold. Conversely, when the valve 24/piston 28 is actuated in the uphole direction the lower hydraulic pressure is above the upper hydraulic pressure by a given differential threshold. Pressure spikes 78 on the graph indicate the full actuation or stroke of the piston 28 in each direction. Additionally, motor current spikes 80 beyond a predetermined threshold effectively provide confirmation the piston 28 has reached the end of its stroke and the actuation is complete in a particular direction.

Figure 6:
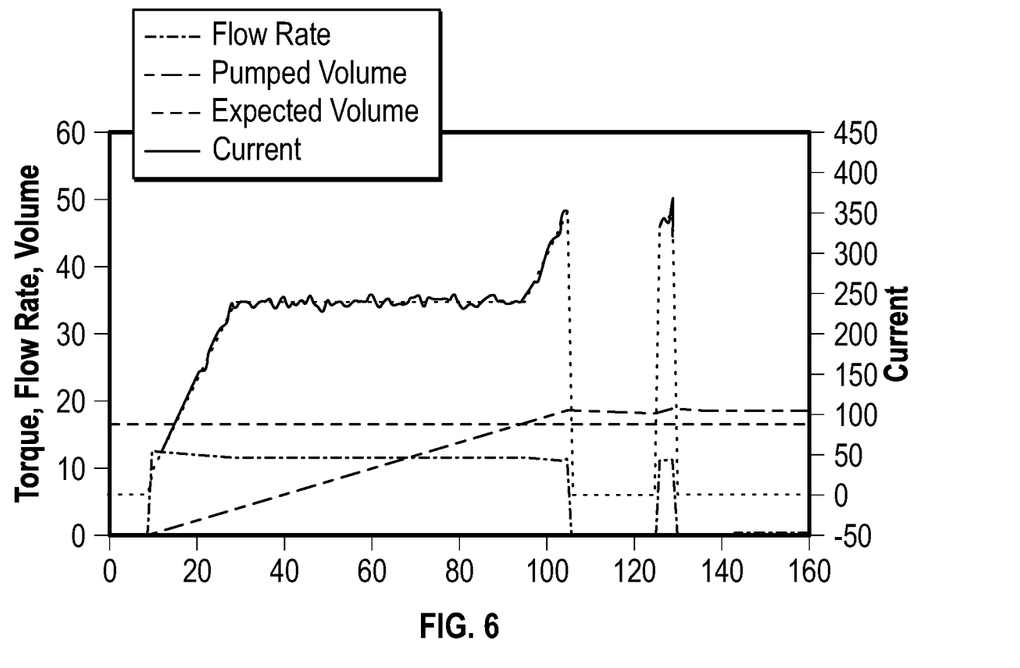
FIG. 6 is another graphical illustration showing the use of sensor data to deduce valve position, according to an embodiment of the disclosure.

Referring generally to FIG. 6, a graph is provided to illustrate estimation of the position of piston 28 by mapping pump rotations and fluid displacement over time while including the effects of temperature and pressure on pump efficiency and on volume of hydraulic actuating fluid. This estimation may be carried out by a suitable algorithm programmed into processor 66 or other suitable controller. According to this example, the rotational speed of motor 34 is monitored via speed sensor 58. By way of example, speed sensor 58 may be in the form of a Hall effect sensor or it may be a sensor which estimates motor speed based on motor current waveform.

In this embodiment, the motor 34 is directly coupled to the pump 36 so the motor speed, e.g. rotations per minute, matches the pump speed. Integrating the pump speed over time results in pump revolutions. It should be noted the pump may be a positive displacement pump so that the volume displaced correlates to the number of revolutions. Additionally, various factors may be used to account for pump efficiency losses and for the impact of temperature and pressure which have an effect on fluid compressibility and thermal expansion. By accounting for these various factors, an appropriate conversion factor may be used to convert pump revolutions to volume of actuating fluid pumped.

Additionally, the volume of actuating fluid pumped may be correlated to the position of piston 28. This information enables a simple conversion from volume pumped via pump 36 to the position of piston 28 and these calculations are readily performed via processor 66. According to this technique, the position of valve 24/piston 28 can be measured in a proportional way, e.g. 0-100% closed, rather than in a binary way measuring simply whether the valve is open or closed. This ability enables controlled partial actuation of valve 24 to positions which allow partial flow downhole and uphole as may be desired for certain applications.

Figure 7:
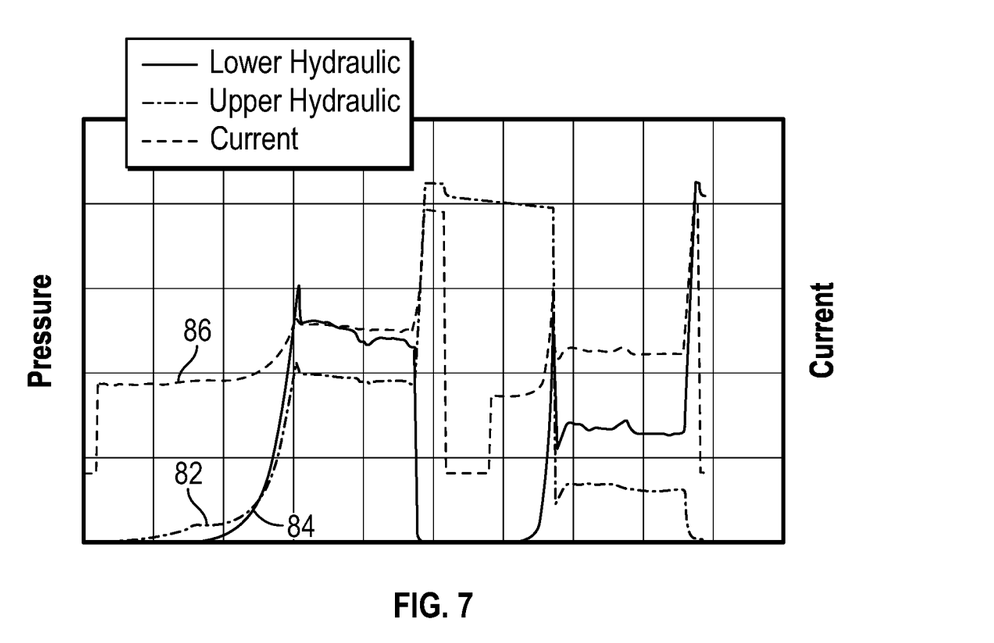
FIG. 7 is another graphical illustration showing the use of sensor data to deduce valve position, according to an embodiment of the disclosure.

In some embodiments, the processor 66 may be programmed with control algorithms which determine valve position by estimating hydraulic fluid pressure as a function of motor current, as graphically illustrated in FIG. 7. In FIG. 7, the pressures monitored by pressure sensors 50 are indicated by pressure graph lines 82, 84 while the monitored motor current is indicated by graph line 86. The graph shows that motor current 86 and fluid pressures 82, 84 are correlated. Because of this, the rate of change of current can be used to reliably predict a rate of change in pressure when implementing a factor deduced from test data.

Furthermore, the spikes in pressure and motor current (as illustrated) can be used to determine the end of stroke with respect to piston 28 and thus the operational configuration of valve 24. Also, when there is no change in current, a rate of change in pressure drop may be estimated due to a leak factor deduced from test data. Additionally, zero crossings of the current value can be used to estimate a shift from one pressure to the other, e.g. between lower or upper pressure with respect to piston 28, if a minimum value of current is enforced while actuating piston 28/valve 24.

In some embodiments, additional or alternate sensing mechanisms may be used to determine valve position. For example, a physical sensor 88, such as a tattletale and proximity switch assembly, may be employed to physically determine the position of valve 24 (see physical sensor 88 in FIGS. 8 and 9). In the example illustrated in FIGS. 8 and 9, the physical sensor 88 is in the form of a tattletale sensor which is a small mechanical device comprising a lever 90. The lever 90 is sealed and protrudes into a flow path of a hydraulic line 92 from a position outside of the hydraulic line 92.

Figure 8:
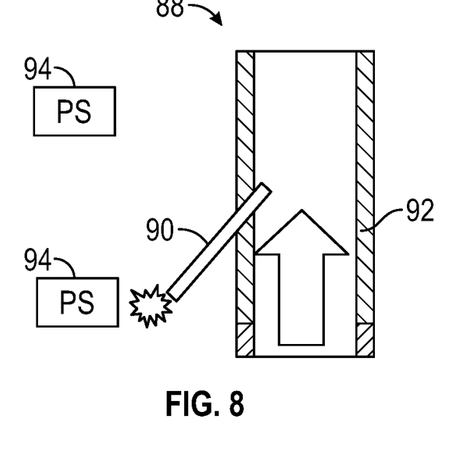
FIG. 8 is a schematic illustration of an example of a mechanical switch sensor for determining valve position, according to an embodiment of the disclosure.
Figure 9:
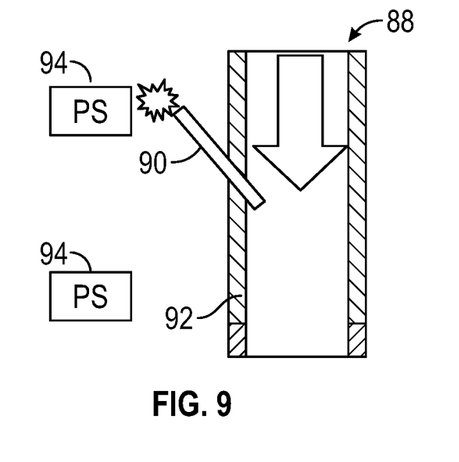
FIG. 9 is a schematic illustration of the mechanical switch sensor of FIG. 8 but in a different operational position, according to an embodiment of the disclosure.

When flow moves along the interior of hydraulic line 92 in a first direction, the lever 90 is moved in one direction as illustrated in FIG. 8. Once the lever 90 reaches an actuation limit, a proximity sensor 94 is triggered to provide an active digital input. Similarly, when the flow moves along the interior of hydraulic line in a second (opposite) direction, lever 90 is moved in an opposite direction as illustrated in FIG. 9. When the lever 90 reaches an actuation limit in this direction, another proximity sensor 94 is triggered to provide an active digital input. The physical sensor or sensors 88 may be placed along one or more of the hydraulic actuation flowlines 42 or at other suitable locations to monitor the flow of fluid with respect to piston 28/valve 24 so as to indicate valve position.

It should be noted the sensors and algorithms described above may be used in a redundant manner to provide robust monitoring of valve actuation which is resistant to sensor failure. Various combinations of actuation sensing redundancy may be employed via suitable algorithms and use of data from various combinations of sensors 48. According to one embodiment, the difference in pressure between the two pressure sensors 50 located on an upstream and downstream side of piston 28 serve as the primary means for measuring the actuation position of valve 24. In the event of pressure sensor failure, the current data may be used as a backup indicating actuation position of valve 24. If the current sensing fails, the physical sensor 88, e.g. a tattletale proximity switch, may be used to determine the actuation position of valve 24. This type of embodiment provides three layers of redundancy for determining valve actuation position.

Figure 10:
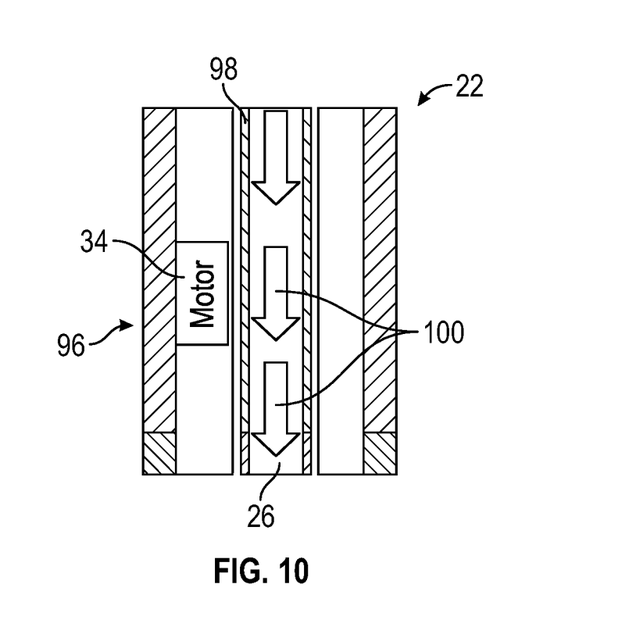
FIG. 10 is a cross-sectional illustration of an example of an electronically controlled motor used to operate a pump for controlling valve position in combination with a motor cooling system, according to an embodiment of the disclosure.

Referring generally to FIG. 10, some embodiments may utilize a motor cooling system 96 to remove heat from the motor 34. By way of example, the cooling system 96 may comprise a metal chassis frame 98 positioned to allow heat conduction from the motor 34 to the fluid (represented by arrows 100) flowing along interior 26. When current runs through the windings of the electric motor 34, an increase in temperature occurs. Eventually, the motor temperature may reach its operational limit and, if the motor continues to operate, the temperature may keep rising beyond its design limit. This excess heat subjects the motor 34 to potential damage.

The cooling system 96 removes this heat and thus reduces the motor temperature to extend the amount of time it can be powered without reaching its temperature limit. In the example illustrated, the metal chassis frame 98 may be constructed from a temperature conducting material, e.g. a variety of metals, and may be located so the flow of fluid 100 from the surface will conduct heat away from the motor 34 and thus cool the motor. In some applications, the flow rate may be adjusted to speed the rate of cooling as desired.

In some applications, a low power consumption actuation mode may be utilized. Such a low power consumption actuation mode is useful with battery-powered tool strings because the mode may be used to reduce motor current output when the valve 24 is at a target position. Instead of motor 34 maintaining the valve 24 at the target position, a pressure differential and friction may be used to help hold the valve 24 at this desired position.

By way of further explanation, when piston 28 is actuated in a given direction there is a pressure differential across the piston 28 (see differential between the lower hydraulic pressure and upper hydraulic pressure illustrated in FIG. 5). This pressure differential exerts a force that keeps the valve 24 at its existing position. Such force would have to be overcome by other means to actuate the valve on its own due to external factors. In addition, there are frictional forces acting on piston 28 that also would need to be overcome for the valve 24 to actuate on its own due to external factors.

As a result, the amount of current used to drive the motor 34 can be reduced to a minimum by taking advantage of the differential pressure and frictional forces. Also, when the pressure differential is above a threshold determined during, for example, testing, the current to the motor 34 may be turned off. In many applications, the pressure differential may be enough to maintain the valve 24 at the target position and there is no need to waste energy in the motor 34. However, when the pressure differential goes below a threshold, the motor 34 may be driven to replenish the pressure differential. The motor 34 may be driven with a current limit proportional to the pressure difference, thus ensuring the amount of power consumption is proportional to the amount of correction needed. This approach further saves power that would otherwise be directed to the motor 34.

Figure 11:
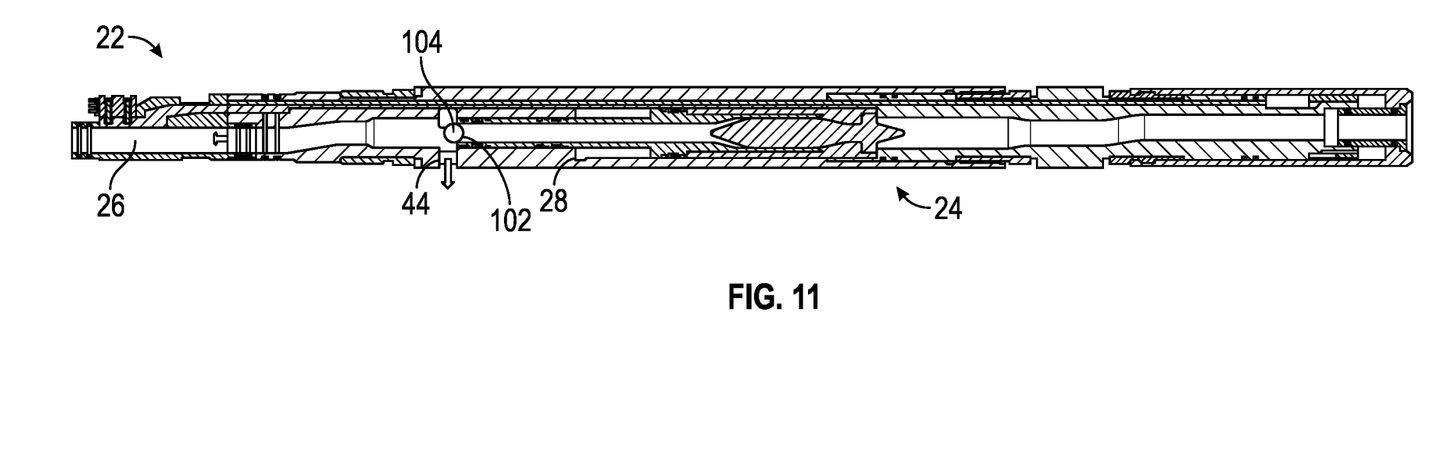
FIG. 11 is a cross-sectional illustration of an example of the valve in which a ball drop seat is oriented for use with a ball to provide a backup method for valve operation, according to an embodiment of the disclosure.

Referring generally to FIG. 11, an embodiment is illustrated in which another layer of redundancy has been added to ensure the ability to actuate valve 24 in the event of various failures, such as failure of motor 34. In this example, the piston 28 of valve 24 includes a ball seat 102 as a contingency mechanism. During normal operations of valve 24, the valve 24 may be actuated based on electronic input, as described above, so as to direct fluid flow to the downhole tool 30 or to perform a different downhole operation. In the event of actuator failure, e.g. motor failure, a ball 104 may be dropped downhole and into engagement with ball seat 102. By using ball 104 to block flow through the valve 24 along interior 26, the fluid flow along interior 26 may be redirected. Additionally, positioning the ball 104 against the ball seat 102 enables the use of pressure along interior 26 to shift valve 24 to a different operational position. A pressure relief valve or valves may be incorporated into pump 36 or positioned at other suitable locations to facilitate release of hydraulic actuating fluid pressure in flow lines 42, thus enabling shifting of piston 28 via pressure applied against ball 104/ball seat 102 through interior 26.

Depending on the downhole application, the valve 24 may comprise a single valve or a plurality of valves. Additionally, the valve 24 may be configured to provide a variety of desired operational modes to achieve appropriate downhole tool operation and/or downhole fluid flows. The actuation system may comprise various components, e.g. various motors and pumps, to control shifting of piston 28.

Similarly, various types of controllers and processors may be employed. For example, a variety of computer programmable controllers or other suitable controllers able to receive command inputs and to provide appropriate control signals to actuation module 32/valve 24. The microprocessor 66 or other suitable processor also may be programmed with various types of algorithms to facilitate monitoring and control of the valve 24, e.g. monitoring and control from the surface. Similarly, the sensors 48 may comprise pressure sensors, temperature sensors, current sensors, voltage sensors, position sensors, and/or other sensors selected to provide feedback on valve position. The electrically controlled valve system may be used with many types of well strings in a variety of well applications.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method, comprising:
    positioning a valve along a well string to control a flow of fluid used in performing a downhole operation;
    actuating the valve between a plurality of operational positions via an actuator module receiving electronic control signals transmitted downhole from the surface, wherein the valve is configured to shift between the plurality of operational positions in response to receiving actuating fluid from a pump, wherein the actuator module comprises a motor connected to the pump;
    receiving, via a speed sensor, one or more indications of a rotational speed of the motor;
    determining a volume of the actuating fluid pumped to the valve based on the rotational speed of the motor; and
    determining an operational position of the plurality of operational positions based on the volume of the actuating fluid pumped to the valve.

2. The method as recited in claim 1, further comprising providing a bi-directional pump connected to the motor, and a motor controller which receives the electronic control signals from the surface, wherein actuating the valve comprises using the bi-directional pump to shift a valve piston to selected operational positions of the plurality of operational positions, the valve piston being shifted via hydraulic actuating fluid received from the bi-directional pump.

3. The method as recited in claim 2, further comprising utilizing a ball and a ball drop seat located in the valve to provide redundancy against failure for actuating the valve to a desired operational position of the plurality of operational positions.

4. A system, comprising:
    a valve positioned along a well string, the valve being configured to control flow of fluid to a well tool;
    an actuator module having a motor, a pump connected to the motor, and a motor controller, the actuator module being coupled into the well string such that the pump is able to supply actuating fluid to the valve so as to provide controlled shifting of the valve between operational positions according to electronic control signals received by the motor controller; and
    a sensor system having one or more sensors located to provide feedback to the motor controller regarding the operational position of the valve, wherein the one or more sensors comprise a current sensor configured to measure a current associated with the motor, and wherein the motor controller is configured to determine the operational position of the valve based on the current associated with the motor;
    wherein the motor controller is configured to determine the operational position of the valve by estimating hydraulic fluid pressure as a function of the current.

5. The system as recited in claim 4, wherein the valve comprises a piston shiftable between the operational positions via hydraulic actuation fluid provided under pressure from the pump.

6. The system as recited in claim 4, wherein the valve comprises a ball drop seat positioned to receive a ball dropped down through an interior of the well string, thus providing redundancy against failure for actuating the valve to a desired operational position.

7. The system as recited in claim 5, wherein the one or more sensors further comprise one or more mechanical sensors located to sense positioning of the valve.

* * * * *